United States Patent
Hansl et al.

(10) Patent No.: US 11,136,201 B2
(45) Date of Patent: Oct. 5, 2021

(54) METHOD FOR THE PICKING AND PACKING OF GOODS AND DEVICE THEREFOR

(71) Applicant: KNAPP SYSTEMINTEGRATION GMBH, Leoben (AT)

(72) Inventors: Rudolf Hansl, Linz (AT); Manfred Grablechner, Trofaiach (AT); Günther Kainersdorfer, St. Peter-Freienstein (AT)

(73) Assignee: KNAPP SYSTEMINTEGRATION GMBH, Leoben (AT)

(*) Notice: Subject to any disclaimer, the term of this patent is extended or adjusted under 35 U.S.C. 154(b) by 0 days.

(21) Appl. No.: 16/487,558

(22) PCT Filed: Feb. 12, 2018

(86) PCT No.: PCT/EP2018/053450
§ 371 (c)(1),
(2) Date: Aug. 21, 2019

(87) PCT Pub. No.: WO2018/153717
PCT Pub. Date: Aug. 30, 2018

(65) Prior Publication Data
US 2019/0382212 A1    Dec. 19, 2019

(30) Foreign Application Priority Data
Feb. 21, 2017 (DE) .................. 10 2017 001 668.2

(51) Int. Cl.
*B65G 47/90* (2006.01)
*B65G 57/00* (2006.01)
(Continued)

(52) U.S. Cl.
CPC ........... *B65G 47/90* (2013.01); *B65G 57/005* (2013.01); *B65G 57/035* (2013.01); *B65G 57/22* (2013.01); *B65D 2571/00043* (2013.01)

(58) Field of Classification Search
CPC .... B65G 47/90; B65G 57/005; B65G 57/035; B65G 57/22; B65G 61/00; B65D 2571/00043
See application file for complete search history.

(56) References Cited

U.S. PATENT DOCUMENTS 3,433,372 A * 3/1969 Galloway ............ B65G 59/068
414/788.9
3,623,618 A * 11/1971 Shaw .................. B65G 59/066
414/797.7
(Continued)

FOREIGN PATENT DOCUMENTS

CN    204 471 375    7/2015
DE    27 50 741    5/1979
(Continued)

OTHER PUBLICATIONS

German Office Action conducted in counterpart German Appln. No. 10 2017 001 668.2 (dated Feb. 12, 2018) (w/ partial English language translation).
(Continued)

*Primary Examiner* — Lynn E Schwenning
(74) *Attorney, Agent, or Firm* — Greenblum & Bernstein, P.L.C.

(57) ABSTRACT

The invention relates to a method for the picking and packing of goods (5) from at least one source storage installation (1) on at least one target load carrier (3) according to a packing layout. In order to achieve a particularly efficient method, it is provided according to the invention that a partial amount of the goods (5) that are to be positioned on the target load carrier (3) are arranged in a (Continued)

grouping region (2) according to a grouping (6) that corresponds to a part of the packing layout, after which the grouping (6) is moved from the grouping region (2) into a position on the target load carrier (3) that corresponds to the packing layout. Furthermore, the invention relates to a device for the picking and packing of goods (5) from at least one source storage installation (1) on at least one target load carrier (3) according to a packing layout.

33 Claims, 4 Drawing Sheets

(51) Int. Cl.
*B65G 57/03* (2006.01)
*B65G 57/22* (2006.01)

(56) References Cited

U.S. PATENT DOCUMENTS

| | | | | |
|---|---|---|---|---|
| 3,844,422 | A * | 10/1974 | Smith | B65G 57/245 414/789.9 |
| 4,095,720 | A * | 6/1978 | Delbrouck | B65D 1/243 220/519 |
| 4,271,755 | A | 6/1981 | Kintgen et al. | |
| 4,426,184 | A * | 1/1984 | Boyland | B65G 57/245 414/793.4 |
| 4,439,084 | A * | 3/1984 | Werkheiser | B65G 57/245 414/792 |
| 4,988,264 | A | 1/1991 | Winski | |
| 5,525,029 | A | 6/1996 | Taylor | |
| 5,738,484 | A | 4/1998 | Taylor | |
| 5,961,275 | A | 10/1999 | Winski et al. | |
| 6,056,496 | A | 5/2000 | Myers et al. | |
| 7,993,095 | B2 * | 8/2011 | Reichler | B65G 57/00 414/789.6 |
| 8,145,350 | B2 | 3/2012 | Lancaster, III et al. | |
| 8,657,555 | B2 * | 2/2014 | Kokubo | B65H 33/16 414/789.9 |
| 9,090,427 | B2 * | 7/2015 | Stollery | B65H 29/18 |
| 9,126,770 | B1 * | 9/2015 | Widder | B25J 9/0093 |
| 9,221,628 | B2 * | 12/2015 | Dax | B65H 33/16 |
| 9,862,556 | B2 * | 1/2018 | Cavelius | B65G 57/10 |
| 10,906,186 | B2 * | 2/2021 | Takahashi | B25J 9/1697 |
| 2002/0064449 | A1 * | 5/2002 | Vincent | B65G 59/026 414/796.5 |
| 2004/0146390 | A1 * | 7/2004 | Lancaster | B65G 59/067 414/797.4 |
| 2005/0063815 | A1 * | 3/2005 | Pierson | B65G 57/24 414/799 |
| 2008/0095601 | A1 * | 4/2008 | Yohe | B65G 57/03 414/788 |
| 2009/0279999 | A1 * | 11/2009 | Faulkner | B65G 61/00 414/800 |
| 2010/0146907 | A1 | 6/2010 | Fritzsche et al. | |
| 2010/0185329 | A1 * | 7/2010 | Parker | B65G 61/00 700/259 |
| 2011/0076128 | A1 * | 3/2011 | Johnsen | B65G 21/14 414/791.6 |
| 2012/0297733 | A1 * | 11/2012 | Pierson | B65B 35/50 53/447 |
| 2013/0212982 | A1 * | 8/2013 | Baumann | B65G 57/245 53/447 |

FOREIGN PATENT DOCUMENTS

| | | |
|---|---|---|
| DE | 4122953 | 1/1993 |
| DE | 101 11 680 | 9/2002 |
| DE | 20119851 | 4/2003 |
| EP | 1 180 487 | 2/2002 |
| EP | 1321396 | 6/2003 |
| WO | 94/12415 | 6/1994 |
| WO | 2010/059923 | 5/2010 |

OTHER PUBLICATIONS

"Schneider Electric: Application Notes: Palletizing machine with grippers", downloaded from internet on Nov. 20, 2017: URL:http://static.schneider-electric.us/docs/MachineControl/0105DB0303.pdf, XP055426805, Dec. 26, 2005, pp. 1-8.

Official Communication issued in International Bureau of WIPO Patent Application No. PCT/EP2018/053450, dated Aug. 16, 2018.

* cited by examiner

METHOD FOR THE PICKING AND PACKING OF GOODS AND DEVICE THEREFOR

The invention relates to a method for the picking and packing of goods from at least one source storage installation on at least one target load carrier according to a packing layout.

Furthermore, the invention relates to a device for the picking and packing of goods from at least one source storage installation on at least one target load carrier according to a packing layout.

From the prior art, various methods and devices for the picking and packing of goods from a source storage installation on a target load carrier are known. A disadvantage of such methods and devices as are known from the prior art is that only a relatively low speed is achieved during picking and packing.

This is addressed by the invention. The object of the invention is to specify a method of the type named at the outset with which a particularly high throughput is achieved during picking and packing.

In addition, a device of the type named at the outset is to be specified for carrying out a method of this type.

According to the invention, the first object is attained with a method of the type named at the outset in which a partial amount of the goods that are to be positioned on the target load carrier is arranged in a grouping region according to a grouping that corresponds to a part of the packing layout, after which the grouping is moved from the grouping region into a position on the target load carrier that corresponds to the packing layout.

Within the scope of the invention, it was discovered that a throughput of the picking and packing process can be increased if the goods are not moved individually onto the target load carrier, as has been the case previously, but rather if groupings composed of one or more goods are formed in advance, which groupings are then moved onto the target load carrier with a single movement.

In this manner, a process step in which the goods are arranged on the target load carrier according to the packing layout is divided into two process steps, namely into a first process step in which the goods are grouped according to the packing layout, and into a second process step in which the goods grouped into a grouping according to the packing layout are moved onto the target load carrier. Through this division, a higher overall speed can be achieved, in particular since multiple goods can be moved simultaneously with each movement completed in a region of the target load carrier.

It is beneficial if multiple groupings are removed simultaneously from the grouping region and moved sequentially or simultaneously into positions on the target load carrier that correspond to the packing layout. In this manner, a movement sequence in the process is optimized, since multiple groupings can be moved out of the grouping region at the same time. If the groupings are arranged adjacently to one another on the target load carrier according to the packing layout, they can be moved simultaneously into the positions which correspond to the packing layout. Otherwise, the groupings, which can respectively comprise one or more goods, are positioned sequentially, preferably in a path-optimized manner, on the target load carrier, typically using a robot or the like with which multiple goods can be picked up and positioned.

For example, goods can be arranged in two or more rows in the grouping region, after which the goods are simultaneously removed from the grouping region by a positioning device and positioned sequentially or simultaneously in respective positions on the target load carrier according to the packing layout. This minimizes movements of the positioning device so that a particularly efficient method is obtained.

Preferably, the goods of one or more groupings are already positioned in the grouping region in accordance with the packing layout on the target load carrier, so that the grouping that corresponds to a part of the packing layout can be removed from the grouping region and arranged on the target load carrier without changing a position of the goods of the grouping relative to one another.

The individual groupings can, however, also be arranged in the grouping region such that, after the groupings are simultaneously picked up with a positioning device, for example a gripper, they are sequentially arranged by the positioning device on the target load carrier in the positions corresponding to the packing layout. Thus, goods arranged into two rows in the grouping region can, for example, be removed from the grouping region in one step, after which the goods are moved to different positions on the target load carrier. In this case, a position of the goods relative to one another can also change. Movement sequences are thus minimized and/or optimized so that a particularly efficient method results. By contrast, in methods from the prior art, goods are only removed from a grouping region and arranged on a target load carrier individually.

The method can be carried out with goods having the most varying dimensions. It can thereby be provided, especially for small goods, that multiple goods are pre-picked-and-packed into containers, after which the containers are integrated into the packing layout and positioned on the target load carrier according to the packing layout. Thus, even small goods and goods that otherwise cannot be efficiently picked and packed, for example, can be picked and packed in an automated manner using the containers. With the containers, small goods can thus also be included in calculations and removed from storage for a palletizing order or picking and packing order like goods of a normal size. The containers can then be picked and packed in an automated manner like normal, larger goods, for example as part of groupings.

It has proven effective that multiple, in particular identical, goods are simultaneously moved out of the source storage installation to the grouping region in order to achieve a particularly high efficiency. In addition, goods can also already be consolidated or grouped into packaging units in the source storage installation and, if needed, multiple packaging units can also be simultaneously removed from the source storage installation and positioned on the target load carrier as a packaging unit stack, in order to optimize movement sequences. It can thus be advantageous that a grouping of goods formed in the source storage installation, which grouping corresponds to a part of the packing layout, is removed from the source storage installation and moved as a grouping via the grouping region onto the target load carrier into a position that corresponds to the packing layout, without any division and/or without any change in a position of the individual goods relative to one another. For example, this can be cartons stacked in the source storage installation that are moved onto the target load carrier in stacked form without an additional separating step. Furthermore, containers with identical goods can be arranged in the source storage installation. A container of this type can then be removed from the source storage installation together with the goods, after which the container is moved onto the target load carrier, or the goods required for the order are removed from the container and the container and the remaining goods are moved into the source storage installation again. On the one hand, a reduced footprint in the source storage installation is thus achieved. On the other hand, movements or transports out of and into the source storage installation are reduced.

In principle, individual goods can thus be removed separately or multiple goods simultaneously from the source storage installation, wherein the goods can be moved out of the source storage installation with or without transport containers. If multiple goods are moved simultaneously out of the source storage installation, these goods can be removed from the source storage installation on one or more planes and/or consolidated into multiple stacks, possibly on a transport container.

Target load carriers can in principle be embodied in the most varying ways, for example as pallets, rolling containers, refrigerated containers, refrigerated rolling containers and the like, so that the method can be applied to a wide range of different goods and industries.

The method can be used for picking and packing on empty target load carriers. However, it is also equally possible to use the method for the picking and packing of goods on target load carriers on which goods have already been arranged, for example, since the picking and packing was already started beforehand or because an order has changed.

It is beneficial if an optimization object is positioned on the target load carrier for the purpose of process optimization, particularly in the event of errors. An optimization object is typically understood as an object which is not part of a picking and packing order constituted by goods that are to be positioned on the target load carrier, but rather merely serves to improve the stability and/or packing density of a packing layout. The optimization object can, for example, be made of polystyrene or the like in order to be used in place of a damaged or missing article in the packing layout, and to thus enable a stable positioning of further goods. An optimization object of this type can also be referred to as a tiller dummy, and is normally used when an error occurs, for example, when an error caused by an article breakage occurs in a sequence of the prepared articles. In this manner, the process sequence in the event of errors can be optimized in order to minimize the effects of errors.

The optimization object can be produced in advance. For example, optimization objects of a widely varying size can be made available so that an optimization object of an appropriate size can be integrated where necessary during picking and packing. It has proven particularly beneficial if the optimization object is produced over the course of the picking and packing. The optimization object can then be exactly adapted to the respective requirement so that a particularly efficient method is achieved. For example, the optimization object can be produced in an automated manner in accordance with a need during the picking and packing by cutting or in a 3D printing process, preferably from a plastic, foam, wood or the like. Of course, mechanical requirements that result from a position of the optimization object in the packing layout or from the other goods arranged on the optimization object in the packing layout can also be taken into consideration in the selection and/or production of the optimization object. Thus, the optimization object can in principle have any shape, for example, the shape of an article such as a bottle or a block. The optimization object can also be prefabricated in common standard sizes and/or can be able to be modularly assembled from multiple standard parts, so that an optimization object required when an error occurs can be assembled rapidly on demand from prefabricated, preferably modularly combinable, parts with standard sizes, similar to a Lego concept. In this manner, a wide range of different shapes can be produced rapidly and efficiently.

An optimization object can help improve efficiency particularly where an article provided for in the packing layout is unexpectedly not present in the source storage installation or is broken.

There is thus no need to recalculate the packing layout and rearrange the goods already picked and packed in this case, as a result of which a process sequence is not disrupted. It is thus possible to continue using a packing layout which has already been calculated, even in the event of a missing or damaged article, in that the missing article is replaced by an optimization object or a filler dummy. If no optimization object is used, as in methods from the prior art, a breakage of an article can result in time-consuming consequences such as the complete recalculation of the packing layout or an order cancellation, for example. This is thus avoided in a simple manner through the use of optimization objects, so that an error has minimal impact on an order and/or the process sequence and therefore the efficiency of the system.

An optimization object can also be constituted by an object removed from the storage installation, which object can be used in place of a missing article in the packing layout, for example. Thus, a drink bottle that is not part of the picking and packing order can be used as an optimization object, for example, in order to replace a missing bottle. The choice and positioning of the optimization object normally take place in an automated manner with an optimization of the picking and packing process.

A stable packing layout can be achieved if multiple goods are positioned on the optimization object. The optimization object can thus help replace missing or damaged goods and improve a load bearing capacity of the picked and packed goods.

Particularly for the ability to also place additional objects in a stable and automated manner on objects which taper upwards, such as bottles for example, it has proven effective that the optimization object is a planar object, in particular a piece of cardboard. The optimization object can thus be arranged on a layer of bottles, for example, so that additional goods can be placed on the bottles. Otherwise, this can be problematic, especially with small goods, as these goods can fall between the necks of the bottles and would thus result in a disorderly packing layout. Through a manual or automated placement of a planar optimization object such as a piece of cardboard or a board, an intermediate layer is thus formed in a simple manner in order to improve the stability of the packing layout.

A planar optimization object such as a board or a piece of cardboard can also be used to evenly distribute a load of additional goods positioned on the target load carrier to goods arranged below the optimization object. As a result, it is also possible, for example, to arrange additional goods on goods with only a slight load-bearing capacity, such as yogurt cups, in order to optimally utilize a load volume.

It is beneficial if the grouping is formed in the grouping region with a sequential arrangement of goods in the grouping region, after which the grouping is moved from the grouping region into a position on the target load carrier that corresponds to the packing layout with a, preferably continuous, movement of a positioning device. This enables a particularly efficient method since the grouping is transported from the grouping region onto the target load carrier without interruption. Typically, the grouping region is directly assigned to the target load carrier so that a movement of the positioning device with a short stroke is sufficient. Because the grouping is not formed until the picking and packing region by a sequential arrangement of goods in the grouping region, a maximum flexibility is achieved since goods of a grouping can, for example, be transported from different source storage installations to the grouping region and grouped into a grouping in said region.

During a transport from the source storage installation to the grouping region, the goods are typically oriented according to an orientation on the target load carrier that corresponds to the packing layout, in particular on an orientation section. For this purpose, an orientation section comprises corresponding manipulators and/or actuators with which the individual goods are tilted and/or rotated. Thus, in a grouping and movement of the grouping of goods onto the target load carrier, the goods can be moved in an exclusively translational manner, so that the corresponding movement sequences can be performed more simply and more quickly. Normally, the goods are thus moved in a solely translational manner in the grouping region and during a movement from the grouping region onto the target load carrier.

An orientation of the goods during a transport from the source storage installation to the grouping region can, of course, also take place in any other manner, for example, using one or more robots. Robots can also be used to form partial layers which are subsequently positioned on the target load carrier, for example using a gripper.

To achieve high system uptime, it is beneficial if the goods are transported from the source storage installation to the target load carrier on two transport lines connected in parallel. The method can thus be carried out even if one transport line fails.

It is advantageous if grouping regions are arranged on multiple sides of the target load carrier, from which regions grouped goods are moved onto the target load carrier from different directions. A simultaneous loading of the target load carrier with groupings from multiple sides is thus possible, so that a particularly high speed is achieved. Whereas a positioning of the individual goods often begins at a sidewall or corner that acts as a limit stop during a picking and packing in methods from the prior art, a positioning of an article or a grouping in the method according to the invention also takes place on the target load carrier without a limit stop during a picking and packing from multiple sides of the target load carrier. In a picking and packing from multiple sides, the process normally begins with a layer roughly in a center of the target load carrier, although in principle it is possible to begin at any point of the target load carrier depending on the allocation of a layer layout to the sides from which picking and packing occurs. It is therefore beneficial if an arrangement of goods and/or groupings on the target load carrier takes place in an automated manner and with high precision in order to achieve a packing layout with high stability and packing density. Typically, in a picking and packing from two sides, goods from one side are moved approximately to a center of the target load carrier, so that roughly one half of the packing layout is respectively formed from one side each. To arrange goods in a particularly stable and positionality accurate manner on the target load carrier, multiple, for example two, positioning devices, in particular two grippers, can pick and pack goods from opposite sides, wherein goods are simultaneously arranged on the target load carrier such that they are in contact with one another, particularly on the rear sides thereof. In this case, an artificial limit stop is formed for each article by the respective other article, which limit stop braces the article. Once a sufficient number of articles form a stable base, goods can also be arranged independently of one another on the target load carrier using the positioning devices.

A packing layout denotes an arrangement of the individual goods on the target load carrier or relative to the target load carrier, which arrangement is to be achieved during the picking and packing process in order to transport the target load carrier together with the goods to a destination such as a supermarket. To obtain a stable packing layout, a packing layout for the target load carrier is typically calculated in advance. Here, different versions can also be computer-generated which, for example, are evaluated according to packing density and stability in order to select an optimal packing layout. A number of transport lines of the device that are connected in parallel and/or a number of sides from which the picking and packing onto the target load carrier takes place, as well as a final position of the individual goods at a destination such as a shelf in a supermarket, can thereby also be factored into the computer-assisted generation of the packing layout. Advantageously, the goods are removed from the source storage installation in an automated manner in an order which corresponds to the packing layout in order to achieve a high efficiency.

It is advantageous if the target load carrier is lowered depending on a loading height, so that goods from the grouping region can be moved onto the target load carrier essentially on one plane independent of a loading height. Through a continuous lowering of the target load carrier, typically a pallet, during the picking and packing depending on a loading height, short transport distances for the goods from the grouping region onto the target load carrier are achieved on the one hand. On the other hand, with a lowering, the target load carrier can also be immediately wrapped with a fixing film or the like in order to stabilize the goods arranged on the target load carrier. For the picking and packing, the target load carrier is typically arranged in a shaft on a movable lift with which the target load carrier is lowered in the shaft during the picking and packing, wherein a wrapper is also normally provided in the shaft. Hereinafter, the term "shaft" can be considered "liftshaft." Typically, the lift is embodied such that, during the wrapping of a first target load carrier, goods can already be picked and packed onto the next target load carrier. For this purpose, it can also be possible to move multiple target load carriers independently of one another in a vertical direction using the lift.

The shaft can thereby also have a variable size in order to be adapted to target load carriers of a different size, for example, rolling containers and half-pallets.

It is beneficial if a sandwich target load carrier is formed, wherein a sandwich target load carrier comprises a bottom-end target load carrier, goods arranged on the bottom-end target load carrier, and at least one additional target load carrier positioned on the goods arranged on the bottom-end target load carrier. Typically, all goods and target load carriers of a sandwich target load carrier of this type are wrapped together in order to obtain high stability. With sandwich target load carriers, a load capacity of a truck can be optimally utilized, even if a loading height of the individual target load carriers is smaller than a maximum load height of the truck. At the same time, a stable transport of the individual target load carriers is ensured when the target load carriers are wrapped together. At a destination, the individual target load carriers of a sandwich target load carrier can, possibly after an unwrapping of the same, be displaced or moved independently of one another.

It has proven effective that the grouping is positioned on the target load carrier using a gripper that can be moved translationally in three spatial directions. The grouping can thus be arranged at different height positions of the target load carrier so that a positioning of the grouping is, for example, also possible when the target load carrier is being lowered in a shaft.

To achieve a particularly high efficiency, it is advantageous if at least two articles or groupings are simultaneously positioned in a parallel manner using at least two grippers. For this purpose, grippers are typically used that can be translationally moved independently of one another in all spatial directions. Collisions of the grippers are thus prevented in a simple manner.

It is beneficial if the target load carrier is moved into a picking and packing region in an automated manner, in which region the goods are moved from the grouping region onto the target load carrier. Furthermore, the target load carriers loaded with goods are typically moved out of the picking and packing region again in an automated manner. Preferably, at a predefined loading height of the target load carrier, a new, empty target load carrier is transported from a magazine to a picking and packing region, in particular a shaft, in which the goods are arranged on the target load carrier. This ensures a continuous and therefore efficient sequence as well as a minimal pallet-change time.

Of course, depending on the spatial conditions, conveying equipment arranged on a platform can also be provided in order to convey empty target load carriers to the picking and packing region. Especially where the target load carriers are embodied to be movable, for example as rolling containers, it can also be provided that the target load carriers are resupplied individually, and not from a magazine.

A grouping can in principle be directly moved onto the target load carrier from the grouping region. To achieve a particularly high efficiency for the method, however, it has proven beneficial that the grouping is moved from the grouping region into a transfer region from which the grouping is moved onto a gripper, with which gripper the grouping is positioned on the target load carrier according to the calculated packing layout. The gripper is thus decoupled from the grouping region due to the intermediately arranged transfer region, so that the gripper can be operated independently of the grouping region. As a result, a grouping formed in the grouping region can be transferred to the transfer region, and a new grouping formed in the grouping region, even if the gripper is not available for a loading, for instance because a grouping or an individual article is being positioned on the target load carrier using the gripper.

It has proven effective that the grouping is positioned on the target load carrier using a gripper which comprises two gripper fingers that can be moved relative to one another and/or can be individually extended. Through an ability of the gripper fingers to be moved relative to one another, the gripper can be used both for large goods or large groupings and also for goods which are to be positioned in small gaps. Typically, the gripper fingers can be moved relative to one another on a horizontal plane. Through a moving of the gripper fingers relative to one another and parallel to a longitudinal axis of the gripper fingers, goods can also be positioned in a narrow gap and/or narrow goods that are arranged between other goods can be removed using a single gripper finger.

Through the ability to move perpendicularly to the longitudinal axis, a distance between the gripper fingers can be easily modified so that the gripper can be used for products having the most varying dimensions.

The two gripper fingers can also be used to position goods in the grouping region in two rows that are moved onto the two gripper fingers in a next step, after which the gripper moves the goods located on the gripper fingers to positions on the target load carrier according to the packing layout. In this manner, a movement sequence is optimized and a particularly efficient method thus achieved, since unlike in methods from the prior art, each article is not positioned individually, but rather multiple articles are arranged on the target load carrier in a cycle in which the gripper is moved from the grouping region to the target load carrier and back.

As noted, a grouping can also comprise only a single article. According to the invention, it can therefore also be provided that two groupings formed by one article each are removed from the grouping region using the gripper, for example, in that a first grouping or a first article is arranged on the first gripper finger and a second grouping or a second article is arranged on the second gripper finger, after which the first article is positioned on the target load carrier in a first target position and the second article is positioned on the target load carrier in a second target position which is not adjacent to the first target position. In this manner, two goods can be picked and packed using only one movement of the gripper from the grouping region or in only one cycle, whereby a particularly efficient method is achieved.

Advantageously, the grouping is positioned on the target load carrier using a gripper without lateral clamping devices. A positioning of goods is thus also possible in gaps of a packing layout without displacing laterally positioned goods or forming empty spaces. The gripper thus normally comprises bottom-end fingers and a top-end pusher for pushing off goods arranged on the gripper.

Typically, the gripper comprises at least one, preferably two, hold-down devices acting from above which stabilize the products during a travel movement and during a pushing-off from the gripper onto the target load carrier. This prevents in particular a tilting of the articles transported using the gripper.

According to the invention, the other object is attained with a device of the type named at the outset in which a grouping region is provided between the source storage installation and the target load carrier, wherein the device is configured for the formation of a grouping that corresponds to a part of the packing layout in the grouping region and for the transport of a formed grouping onto the target load carrier. As a general rule, a formation of a grouping in the grouping region and a transport of a previously formed grouping from the grouping region onto the target load carrier take place in a parallel manner. For this purpose, corresponding manipulators and/or actuators are normally provided in the grouping region in order to form the grouping, in particular movable rams, conveyor chains and the like. For the transport of a formed grouping onto the target load carrier, a gripper is typically provided that can be moved independently of the manipulators used to form the grouping. Between the grouping region and the gripper, a transfer region acting as a buffer can also be provided, into which region fully formed groupings are transported before they are picked up by the gripper.

Typically, the device is configured for the formation of the grouping with a sequential arrangement of goods in the grouping region, wherein a positioning device is provided with which the grouping can be moved from the grouping region into a position on the target load carrier that corresponds to the packing layout, preferably in a continuous movement. In this manner, goods supplied individually via a transport line or the like can be combined into a grouping in the grouping region so that a formation of a grouping of goods from different source storage installations is also possible. A continuous movement with which the grouping from the grouping region is positioned on the target load carrier enables a particularly efficient method.

It is beneficial if an orientation section is provided between the source storage installation and the grouping region, in order to align goods according to an orientation of the goods that corresponds to the packing layout during a transport from the source storage installation to the grouping region. All equipment for moving the goods after the orientation section can thus be embodied as equipment which is movable in a purely translational manner. This enables a simple and cost-effective design of the device.

It has proven effective that at least two transport lines connected in parallel are provided between the source storage installation and the target load carrier to enable a picking and packing even if one transport line fails. Furthermore, through the use of multiple transport lines, it can be ensured that a new grouping is respectively formed in the span of time during which the gripper positions a grouping on the target load carrier. Thus, despite a typically sequential supply of the individual articles via the respective transport lines, a high capacity utilization of the gripper, and therefore a maximum throughput, can be ensured even in the case of orders in which groupings comprise many articles, which are positioned simultaneously by the gripper.

To achieve a particularly high picking and packing speed, it is beneficial if at least two grouping regions are provided on different sides of the target load carrier in order to pick and pack goods on the target load carrier from multiple sides. Typically, two grouping regions are provided on opposite sides of the target load carrier, Which is normally embodied as a pallet, in order to load a left half and a right half of the target load carrier from different grouping regions using different grippers.

To achieve high packing densities, it is advantageous if a gripper without lateral clamping devices is provided in order to move the goods grouped in the grouping region onto the target load carrier. To move groupings of the most varying sizes onto the target load carrier, it is beneficial if a gripper is provided with gripper fingers which can be moved relative to one another.

It is beneficial if a gripper comprises a pusher for pushing the goods onto the target load carrier. The enables a constructionally simple and robust design that can be used to produce a packing layout having a high packing density. For a transport of goods from the grouping region onto the target load carrier, the gripper fingers are typically moved into a position adjacent to the grouping region, after which the grouping is slid onto the gripper fingers against a limit stop. Alternatively, it can also be provided that the gripper fingers are moved under the grouping. The gripper fingers are then lifted together with the grouping and moved to the target load carrier and into a position according to a calculated packing layout, after which the grouping located on the gripper fingers is pushed off of the gripper fingers using a pusher and is thus positioned on the target load carrier according to the packing layout, possibly on goods already arranged on the target load carrier.

Typically, a gripper is provided which can be moved translationally in three spatial directions. The gripper is thus also vertically movable, whereby a positioning of goods on the target load carrier at different height positions is possible, so that goods can be positioned on the target load carrier even if the target load carrier has not yet been lowered by a lift or the like. It is beneficial if at least two grippers for the positioning of goods on the target load carrier are provided, which grippers can be moved independently of one another in a collision-free manner. The enables a particularly efficient method.

To enable a picking and packing even where a part of the device, which is typically operated in a fully automated manner, fails, it is advantageous that the device can be placed in a troubleshooting state in which the target load carrier is manually accessible. In this manner, it is ensured that goods can also be picked and packed manually on the target load carrier if need be. For this purpose, equipment such as the grouping region or the gripper can have the ability to be moved into a region in which it does not impede a manual picking and packing.

Typically, the target load carrier is arranged on a lift with which the target load carrier can be lowered depending on a loading height and can preferably be wrapped. The lift is thus normally located in a picking and packing region in which the goods grouped into groupings are arranged on the target load carrier using one or more grippers.

It has proven effective that a gripper which can be moved to different vertical positions is provided for the positioning of goods on the target load carrier. This is advantageous particularly if multiple grippers are provided for picking and packing on the target load carrier, in order to prevent a collision of the individual grippers. Furthermore, picking and packing is thereby possible at different height positions. This is beneficial if different regions of the target load carrier are occupied by goods of a differing height and picking and packing takes place simultaneously in multiple regions, especially since it is no longer possible to ensure equalization of a loading height for all grippers in this case by means of a lift alone. The grippers are thus advantageously embodied to be translationally movable in all spatial directions or in three directions perpendicular to one another. Of course, if necessary, a gripper can also be embodied for a rotational movement about one or more axes, even though this is normally not required due to the orientation of the goods in accordance with the packing layout.

It is beneficial if the target load carrier can be lowerably positioned in a shaft, wherein a size of the shaft can be adapted to different target load carriers. For this purpose, a shaft embodied with an adjustable size is typically provided in order to be adaptable to different target load carrier formats. In this manner, a particularly high flexibility is obtained, since the device is, for example, simultaneously embodied both for rolling containers and also for half-pallets and since a picking and packing onto the most varying target load carriers is possible depending on the order.

It has proven effective that the device is configured for the formation of sandwich target load carriers, wherein a sandwich target load carrier comprises a bottom-end target load carrier, goods arranged on the bottom-end target load carrier, and at least one additional target load carrier positioned on the goods arranged on the bottom-end target load carrier. Multiple target load carriers embodied as pallets, for example, can thus be positioned on top of one another or doubled up. Normally, sandwich target load carriers of this type are wrapped together in fixing film. Through an arrangement of multiple target load carriers with goods on top of one another in a truck, an optimal utilization of a loading volume can thus be achieved even where the individual target load carriers only have a low loading height. Furthermore, an increased efficiency is thereby achieved during a transport of the target load carriers, since the target load carriers combined to form sandwich target load carriers can be moved onto a truck with a single movement, for example.

The method according to the invention can in principle be used for the picking and packing of the most varying goods. Advantageously, the method according to the invention and the device therefor are used for the picking and packing of articles destined for supermarkets, gas station shops, direct pickup, or electronic commerce. Due to a high number of different articles that must be arranged on a target load carrier, in particular a pallet, destined for a recipient of this type, and because of frequently changing distribution channels, particularly significant improvements in regard to a speed achievable during picking and packing can be made in this case using the method according to the invention.

Additional features, advantages and effects of the invention follow from the exemplary embodiments illustrated below. In the drawings which are thereby referenced:

Figure 1:
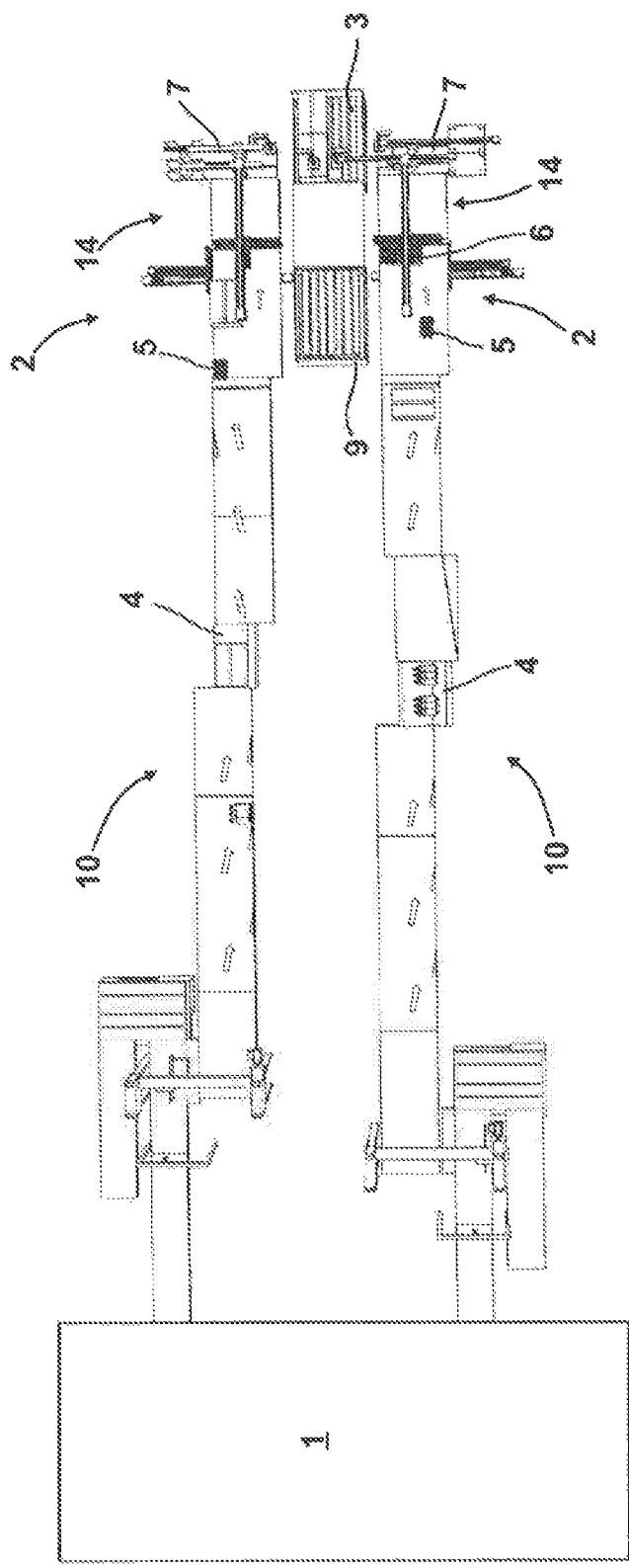
FIGS. 1 and 2 show a device according to the invention in different views.
Figure 2:
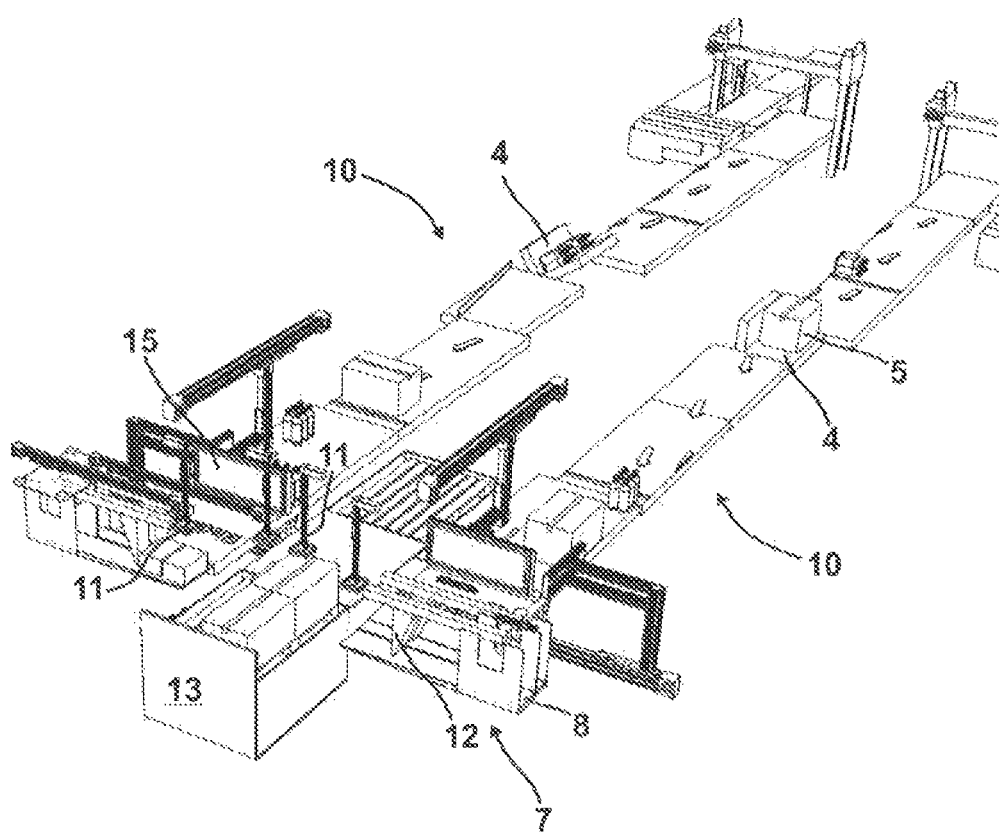

FIGS. 1 and 2 show, in different views, a device according to the invention for carrying out a method according to the invention. Between a source storage installation 1 and a target load carrier 3, two transport lines 10 connected in parallel and partially embodied as an orientation section 4 are thereby provided, as well as one grouping region 2 and one gripper 7 for each transport line 10. Of course, the device according to the invention can also be embodied with only a single transport line 10.

To position goods 5 from the source storage installation 1 on the target load carrier 3 according to a pre-calculated packing layout, goods 5 are removed from the source storage installation 1, typically in an automated manner, possibly while being depalletized. After removal of the goods 5 from the source storage installation 1, the goods 5 are oriented on the orientation section 4 according to an orientation of the goods 5 that corresponds to a final packing layout on the target load carrier 3, for example by a tilting or rotating, so that each subsequent movement of the goods 5 into a position that corresponds to the packing layout on the target load carrier 3 can be exclusively translational.

To optimize the packing layout, optimization objects can be integrated into the packing layout and included in the picking and packing. The optimization objects can in principle have any shape. Planar optimization objects have proven effective for the formation of intermediate layers, so that even small objects can be arranged on a layer formed from bottles, for example. To fill gaps in the packing layout that can result from a breakage of goods 5, for example, optimization objects can also be used that have a shape that corresponds to the gap and/or to the broken goods 5.

The optimization objects can be produced during the picking and packing, for example, in a 3D printing process or the like. Alternatively, goods 5 which are not part of the picking and packing order but whose shape and sturdiness can be used to improve the packing layout can also be removed from the source storage installation. The optimization objects can remain at a destination or be returned back to the source storage installation 1 once delivery is complete.

Goods 5 from a subregion of the packing layout, for example goods 5 from a layer or subregion of a layer, are subsequently grouped into a grouping 6 in a grouping region 2 positioned downstream from the respective transport line 10. For the positioning of the goods 5 that corresponds to the final packing layout within the grouping 6 in the grouping region 2, various actuators known from the prior art, such as pushing devices, conveyor chains and the like, can be provided in the grouping regions 2. Goods 5 supplied via the transport line 10 are thus grouped into groupings 6 that correspond to a part of the packing layout in the grouping regions 2.

Once the goods 5 have been grouped in the grouping regions 2 according to a part of the packing layout, the goods 5 or the formed groupings 6 are moved from the grouping regions 2 to transfer regions 14 downstream from the grouping regions 2 using a transfer pusher 15. From the transfer regions 14, the groupings 6 are then picked up using one gripper 7 each and positioned on the target load carrier 3 according to the calculated packing layout. The packing layout is thereby formed on the target load carrier 3 via the interaction of the two grippers 7.

Through the transfer region 14 respectively positioned intermediately between the grouping region 2 and gripper 7, which region acts as a buffer, movements of the gripper 7 and movements in the grouping region 2 can be performed independently of one another. Thus, a formed grouping 6 can be moved into the transfer region 14 and a new grouping 6 formed in the grouping region 2 even if the gripper 7 is not ready for a loading with a newly thrilled grouping 6, for example, because the gripper 7 is positioning a grouping 6 on the target load carrier 3. A new grouping 6 can thus already be formed in the grouping region 2 while the grouping 6 is being moved onto the target load carrier 3, as a result of which a high speed is achieved.

The target load carrier 3 is positioned in a picking and packing region on a movable lift in a shaft 13 and is continuously lowered by the lift as the loading height increases, so that transport distances for groupings 6 from the grouping regions 2 onto the target load carrier 3 are consistently short. Furthermore, during a lowering of the target load carrier 3, a wrapping of the same with a film or the like immediately takes place in the shaft 13 so that the goods 5 arranged on the target load carrier 3 are already secured in the shaft 13. Once a target load carrier 3 is completely full of goods 5, a new, empty target load carrier 3 is moved into the shaft 13 from a magazine 9 in an automated manner, so that a continuous picking and packing is possible. In the exemplary embodiment illustrated, the new, empty target load carrier 3 is moved from the magazine 9 to an upper end of the shaft 13 with an approximately horizontal movement along a conveying direction of the goods 5 on the transport line 10. Advantageously, the new, empty target load carrier 3 is in this case already moved onto an additional lifting device while the lift is still occupied with the wrapping and lowering of a current target load carrier 3. The new target load carrier 3 is thereby preferably placed on small retaining clamps which execute a vertical stroke in order to lift the empty target load carrier 3 to a desired picking and packing height. In this manner, a continuous and therefore efficient sequence is ensured in which empty target load carriers 3 are supplied and loaded target load carriers 3 are transported away out of the shaft 13 in a downward vertical direction. The gripper 7 can thereby operate continuously and can already load the target load carrier 3 positioned on the additional lifting device while the previous, full target load carrier 3 is still being wrapped on the lift and transported away on the lift. Once the lift is free, it moues upward and receives the new target load carrier 3 from the additional lifting device. Thus, a transfer of the new target load carrier 3 from the additional lifting device to the lift normally still takes place if goods 5 are already being arranged on the new target load carrier 3 using the gripper 7.

The device can also be used for the formation of sandwich target load carriers, wherein multiple target load carriers 3 loaded with goods 5 are arranged directly on top of one another and are wrapped together. For this purpose, after completion of a picking and packing order for one target load carrier 3, an additional, empty target load carrier 3 is positioned directly on top of the completely full target load carrier 3 or on the goods 5 arranged thereupon, after which additional goods 5 are arranged on this empty target load carrier 3. This can, of course, also be repeated multiple times until the target load carriers 3 combined to form a sandwich target load carrier are ultimately wrapped together with the respective goods 5. A maximum cargo space utilization of a truck or the like is thus achieved in a simple manner even where target load carriers 3 are only loaded at a low height. Typically, pallets for sandwich designs of this type or sandwich pallets are used. In this case, a previously loaded target load carrier 3 is thus not transported away as the next target load carrier 3 is being loaded, provided that both target load carriers 3 are part of the same sandwich target load carrier.

Due to the parallel connection of the transport lines 10 and the arrangement of the grouping regions 2 on both sides of the target load carrier 3 and/or a picking and packing region, a particularly high speed is achieved on the one hand. On the other hand, a picking and packing is thus possible even if equipment on a transport line 10 fails, for example, the orientation section 4, the gripper 7 or the like. Typically, roughly one half of the packing layout is thereby respectively formed from one transport line 10 each, usually starting approximately in a center of the target load carrier 3. This also distinguishes the method according to the invention from methods of the prior art, in which the formation of a packing layout normally begins at a limit stop such as a side surface or a corner of the target load carrier 3, wherein a positioning of goods 5 only occurs individually and with a single actuator, however. To achieve a high precision of the packing layout even without such a limit stop, movements of the gripper 7 are typically also performed with extremely high precision.

Figure 3:
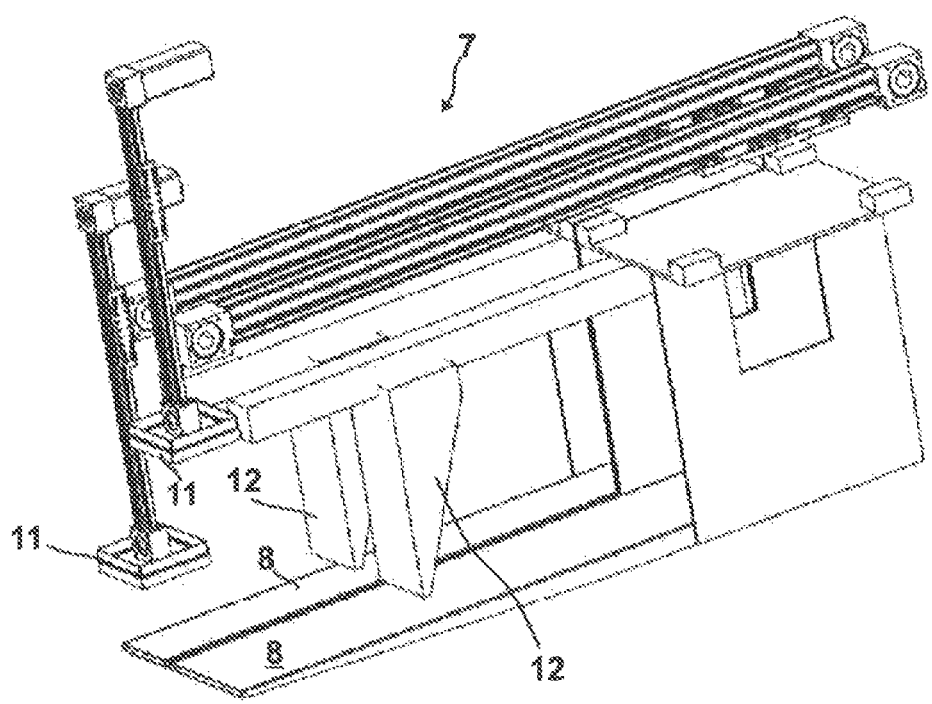
FIG. 3 shows a detailed view of a further device according to the invention.
Figure 4:
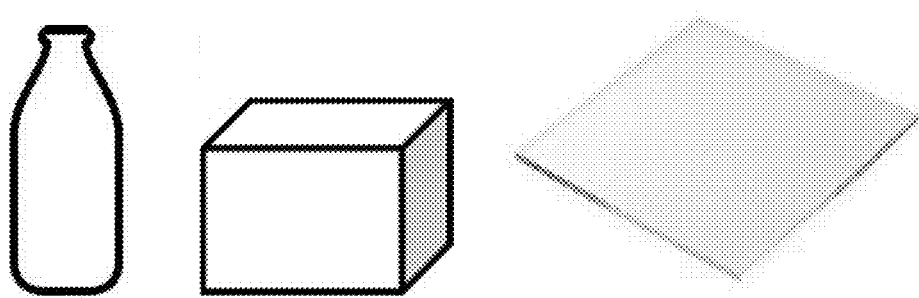
FIG. 4 illustrates three schematic examples of differently shaped optimization objects, namely, the shape of a bottle with a tapering neck, the shape of a block such as that of one of the goods, and a planar shape.

FIG. 3 shows a gripper 7 from a device according to the invention in a detailed view. As can be seen, the gripper 7 comprises two gripper fingers 8 that can be moved relative to one another. A pusher 12 and a hold-down device 11 are thereby assigned to each gripper finger 8 so that goods 5 can be picked up, transported and placed in a targeted and stable manner using the gripper 7. The gripper 7 can normally be moved translationally in all spatial directions, so that a picking and packing with multiple grippers 7 that can perform overlapping and nevertheless collision-free gripping movements is also possible.

In an alternative embodiment of the invention, it is also possible that only one transport line 10 is provided, so that an entire width of the target load carrier 3 is loaded using one gripper 7. In this case, a formation of groupings 6 also takes place prior to a movement of the goods 5 onto the target load carrier 3 in order to achieve a high speed. In an embodiment of this type, the grouping region 2 can also be connected to the gripper 7 via a transfer region 14. In such an embodiment, a positioning of the goods 5 in a position that corresponds to a packing layout thus takes place in that a grouping 6 formed in the grouping region 2 is moved into the transfer region 14, after which the grouping 6 is slid onto the gripper 7 using a transfer pusher 15, whereupon the gripper 7 is moved with the grouping 6 into a region of the target load carrier 3 in which the grouping 6 is to be arranged according to the final packing layout. The grouping 6 is then pushed off of the gripper fingers 8 by means of the pusher 12 and the hold-down device 11, possibly with a retraction of the gripper fingers 8, and moved into a position on the target load carrier 3 that corresponds to the final packing layout. Of course, multiple hold-down devices 11 can also be provided in order to stabilize the grouping 6 on the gripper 7 during a movement. Once a layer has been fully formed on the target load carrier, the target load carrier 3 is in this case also lowered by means of the lift located in the shaft 13 and not illustrated, and is typically wrapped in the shaft 13 in order to ensure a stability.

As illustrated in FIG. 3, the gripper 7 for moving the groupings 6 from the grouping region 2 onto the target load carrier 3 comprises two bottom-end gripper fingers 8, but no lateral clamping devices. During a transport of a grouping 6 from the grouping region 2 onto the target load carrier 3 or out of a transfer region 14 downstream of the grouping region 2 onto the target load carrier 3, the grouping is moved onto the gripper fingers 8, after which the grouping 6 is lifted and positioned in a region of the target load carrier 3 that corresponds to the packing layout, whereupon the grouping 6 is pushed off using a top-end pusher 12 of the gripper 7. If necessary, a hold-down device 11 can also be provided for securing the grouping 6 on the gripper 7 and/or on the target load carrier 3. Because there are no lateral clamping devices provided on the gripper 7, the gripper 7 can also be used to position a grouping 6 into tight gaps in the packing layout without a packing density being reduced as a result.

The gripper 7 illustrated in detail in FIG. 3 can normally be moved translationally in three spatial directions so that, even if multiple grippers 7 are used simultaneously for a target load carrier 3, collisions of the grippers 7 can be prevented. This additionally enables an arrangement of goods 5 at different height positions, so that picking and packing can take place in different height positions using different grippers 7. This is particularly advantageous when the target load carrier 3, at least in relation to a region in which goods 5 are arranged, has not been suitably lowered yet by the lift, so that a continuous process is also ensured if multiple grippers 7 are used.

To enable groupings 6 of a different size to be picked up and positioned in a stable manner, the gripper fingers 8 are embodied such that they can be extended independently of one another. Normally, the gripper fingers 8 have different widths, wherein a narrow gripper finger 8 usually has a width of approximately 150 mm and a wide gripper finger 8 has a width of preferably 250 mm. If only the narrow gripper finger 8 is extended, a grouping 6 or an article can thus also be arranged in a gap only 150 mm wide. For a positioning of large articles, both gripper fingers 8 are moved simultaneously so that a contact face of maximally 400 mm results in a gripper 7 illustrated in the exemplary embodiment. Normally, the narrow gripper finger 8 can only be moved and/or extended relative to the second gripper finger 8 along a longitudinal axis of the gripper fingers 8 so that no space can ever form between the gripper fingers 8.

However, it can also be provided that the gripper fingers 8 can be moved relative to one another perpendicularly to a longitudinal axis of the gripper fingers 8, in particular at the same height, so that the gripper 7 can be used for differently sized products and dimensions. The gripper fingers 8 can also be used to pick up goods 5 or groupings 6 arranged in rows in the grouping region, in order to efficiently pick up multiple goods 5 in a cycle in which the gripper 7 is moved from the grouping region 2 to the target load carrier 3 and back, as a result of which a movement sequence is optimized and a particularly efficient method is achieved. For example, goods 5 arranged in a row can then be picked up using each gripper finger 8, so that one row of goods 5 is positioned on each gripper finger 8. Through the capability of moving the gripper fingers 8 perpendicularly to the longitudinal axis of the gripper fingers 8, an entanglement or collision of goods 5 of one gripper finger 8 with goods 5 of the second gripper finger 8 during a pushing-off can easily be avoided, regardless of whether the goods 5 have identical or different dimensions. In this manner, the rows of goods 5 can be picked and packed on the individual gripper fingers 8 individually and without error. In addition, with gripper fingers 8 that can be moved perpendicularly to the longitudinal axis, both wide and also narrow goods 5 can be transported in a stable manner in that a lateral overhang of the goods 5 is minimized.

With a method according to the invention and a device therefor, a particularly efficient and fast picking and packing is possible, since instead of individual goods 5 not being assembled to form the packing layout until reaching the target load carrier 3, as is the ease with methods from the prior art, groupings 6 of multiple goods 5 are already formed beforehand, which groupings 6 are then positioned on the target load carrier 3 with a single movement. In this manner, different work steps necessary for the formation of a final packing layout on the target load carrier 3 are divided up and can thus be performed in parallel, whereby a high speed is achieved.

A particularly high speed can also be achieved during the picking and packing of a large number of different articles that can be destined for a supermarket, for example, if a target load carrier 3 is not loaded with formed groupings 6 from only one grouping region 2, but rather from two sides via two grouping regions 2, for example.

The invention claimed is:

1. A method for the picking and packing of goods from at least one source storage installation on at least one target load carrier according to a packing layout, said method comprising:
   receiving goods from the source storage installation;
   arranging a partial amount of the goods to be positioned on the target load carrier in a grouping region according to a grouping that corresponds to a part of the packing layout;
   moving the grouping from the grouping region into a position on the target load carrier that corresponds to the packing layout;
   positioning the grouping on the target load carrier using a gripper which comprises a first gripper finger having an assigned first pusher and/or first hold down device and a second gripper finger having an assigned second pusher and/or second hold down device, the gripper fingers being independently movable in relation to each other in a horizontal plane in a direction that extends along a longitudinal axis of the gripper fingers;
   wherein a first grouping is arranged on the first gripper finger and a second grouping is arranged on the second gripping finger, after which the first grouping is placed on the target load carrier in a first target position by the movement of the first gripper finger in cooperation with its assigned first pusher and/or first hold down device, and the second grouping is placed on the target load carrier in a second target position by the movement of the second gripper finger in cooperation with its assigned second pusher and/or second hold down device, wherein the first target position may not be adjacent to the second target position.

2. The method according to claim 1, further comprising: removing multiple groupings simultaneously from the grouping region and sequentially or simultaneously moving the multiple groupings into positions on the target load carrier that correspond to the packing layout.

3. The method according to claim 1, further comprising: moving multiple identical goods simultaneously from the source storage installation to the grouping region.

4. The method according to claim 1, further comprising: positioning an optimization object on the target load carrier for the purpose of process optimization.

5. The method according to claim 4, wherein: an optimization object is added during picking and packing.

6. The method according to claim 4, further comprising: positioning multiple goods over the optimization object position.

7. The method according to claim 4, wherein: the optimization object is planar.

8. The method according to claim 4, wherein: the optimization object is a piece of cardboard.

9. The method according to claim 1, further comprising: forming the grouping in the grouping region with a sequential arrangement of goods in the grouping region;
after said forming the grouping, moving the grouping from the grouping region into a position on the target load carrier that corresponds to the packing layout.

10. The method according to claim 1, further comprising: forming the grouping in the grouping region with a sequential arrangement of goods in the grouping region;
after said forming the grouping, moving the grouping from the grouping region into a position on the target load carrier that corresponds to the packing layout with a continuous movement of the gripper.

11. The method according to claim 1, further comprising: during a transport from the source storage installation to the grouping region, orienting the goods according to an orientation on the target load carrier that corresponds to the packing layout on an orientation section.

12. The method according to claim 1, further comprising: transporting the goods from the source storage installation to the target load carrier on two parallel transport lines.

13. The method according to claim 1, further comprising: arranging grouping regions on multiple sides of the target load carrier, from which grouping regions grouped goods are moved onto the target load carrier from different directions.

14. The method according to claim 1, wherein: the grouping is positioned on the target load carrier using the gripper without lateral clamping devices.

15. The method according to claim 1, wherein: the grouping is positioned on the target load carrier using the gripper that is translationally movable in three spatial directions.

16. The method according to claim 1, wherein: at least two groupings are simultaneously positioned in parallel using at least two grippers.

17. The method according to claim 1, further comprising:
at a predefined loading height of the target load carrier, conveying a new, empty target load carrier from a magazine to a picking and packing region.

18. The method according to claim 1, further comprising:
at a predefined loading height of the target load carrier, conveying a new, empty target load carrier from a magazine to a region of a liftshaft, the goods being arranged in said region the on the target load carrier.

19. The method according to claim 1, further comprising:
forming a sandwich target load carrier, a sandwich target load carrier comprising a bottom-end target load carrier, goods arranged on the bottom-end target load carrier, and at least one additional target load carrier positioned on the goods arranged on the bottom-end target load carrier.

20. The method according to claim 1, wherein:
before positioning the grouping on the target load carrier using a gripper, the grouping of goods is arranged in a predetermined packing layout in the grouping region.

21. A device for the picking and packing of goods from at least one source storage installation on at least one target load carrier according to a packing layout, in accordance with a method according to claim 1, said device comprising:
a grouping region provided between the source storage installation and the target load carrier;
the device being configured to form a grouping that corresponds to a part of the packing layout in the grouping region and for moving a formed grouping onto the target load carrier, the device further including the gripper provided with two gripper fingers in order to move the goods grouped in the grouping region onto the target load carrier, the gripper fingers being configured to move in relation to one another parallel to a longitudinal axis of the gripper fingers.

22. The device according to claim 21, wherein:
the device is configured for the formation of a grouping with a sequential arrangement of goods in the grouping region; and
the gripper is configured to move the grouping from the grouping region into a position on the target load carrier in a continuous movement.

23. The device according to claim 21, further comprising:
orientation section provided between the source storage installation and the grouping region;
the orientation section being configured to align goods according to an orientation of the goods that corresponds to the packing layout during a transport from the source storage installation to the grouping region.

24. The device according to claim 21, wherein:
at least two transport lines extend in parallel with each other and are provided between the source storage installation and the target load carrier.

25. The device according to claim 21, wherein:
at least two grouping regions are provided on different sides of the target load carrier for picking and packing goods on the target load carrier from multiple sides.

26. The device according to claim 21, wherein:
the gripper is configured to move the goods in the grouping region onto the target load carrier without lateral clamping devices.

27. The device according to claim 21, wherein:
the gripper is configured to move translationally in three spatial directions.

28. The device according to claim 21, wherein:
the at least one gripper comprises at least two grippers are provided for positioning of goods on the target load carrier, said grippers being configured to move independently of one another in a collision-free manner.

29. The device according to claim 21, wherein:
the device is configured to be placed in a troubleshooting state in which the target load carrier is manually accessible.

30. The device according to claim 21, wherein:
the target load carrier is arranged in a lift shaft by which the target load carrier is configured to be lowered depending on a loading height.

31. The device according to claim 21, wherein:
the target load carrier is configured to be lowered within a liftshaft, the liftshaft having a size dependent upon a size of different target load carriers.

32. The device according to claim 21, wherein:
the device is configured to form sandwich target load carriers, whereby a sandwich target load carrier comprises:
a bottom-end target load carrier;
goods arranged on the bottom-end target load carrier; and
at least one additional target load carrier positioned on the goods arranged on the bottom-end target load carrier.

33. The device according to claim 21, wherein:
the device is configured such that, before the grouping is positioned on the target load carrier using a gripper, the grouping of goods is arranged in a predetermined packing layout in the grouping region.

* * * * *